US008649553B2

(12) United States Patent
Costes et al.

(10) Patent No.: US 8,649,553 B2
(45) Date of Patent: Feb. 11, 2014

(54) METHOD FOR PREDICTING A TREND OF A METEOROLOGICAL PHENOMENON ON THE BASIS OF DATA ORIGINATING FROM A METEOROLOGICAL RADAR

(75) Inventors: Clémentine Costes, Brest (FR); Jean-Paul Artis, Plouzane (FR)

(73) Assignee: Thales, Neuilly-sur-Seine (FR)

( * ) Notice: Subject to any disclaimer, the term of this patent is extended or adjusted under 35 U.S.C. 154(b) by 585 days.

(21) Appl. No.: 12/833,677

(22) Filed: Jul. 9, 2010

(65) Prior Publication Data

US 2011/0103693 A1 May 5, 2011

(30) Foreign Application Priority Data

Jul. 10, 2009 (FR) .................................. 09 03426

(51) Int. Cl.
*G06K 9/00* (2006.01)

(52) U.S. Cl.
USPC .......... 382/100; 382/103; 382/107; 342/26 R; 702/3

(58) Field of Classification Search
USPC .............. 382/100, 103, 107; 342/26 R; 702/3
See application file for complete search history.

(56) References Cited

U.S. PATENT DOCUMENTS

| | | | |
|---|---|---|---|
| 6,128,578 A * | 10/2000 | Sakaino et al. | 702/3 |
| 6,438,253 B1 * | 8/2002 | Barbaresco et al. | 382/103 |
| 6,920,233 B2 * | 7/2005 | Wolfson et al. | 382/100 |
| 7,062,066 B2 * | 6/2006 | Wolfson et al. | 382/100 |
| 2002/0114517 A1 | 8/2002 | Wolfson et al. | |
| 2008/0097701 A1 * | 4/2008 | Zawadzki et al. | 702/3 |

FOREIGN PATENT DOCUMENTS

FR 2779548 12/1999

OTHER PUBLICATIONS

Papin et al., "Tracking and Characterization of Highly Deformable Cloud Structures", 2000, Springer, ECCV 2000, LNCS 1843, 428-442.*
Yves Arnaud, at al., "Automatic Tracking and Characterization of African Convective Systems on Meteosat Pictures," Journaolf Applied Meteorology, vol. 31, No. 5, May 1992, pp. 443-453.
Yubin Yang, et al., "Automatic Tracking and Characterization of Multiple Moving Clouds in Satellite Images," 2004 IEEE International Conference on Systems, Man and Cybernetics, 2004, pp. 3088-3093.

(Continued)

*Primary Examiner* — Jason M Repko
*Assistant Examiner* — Katrina Fujita
(74) *Attorney, Agent, or Firm* — Baker & Hostetler LLP

(57) ABSTRACT

The present invention relates to a method for predicting a trend of a meteorological phenomenon on the basis of data originating from a meteorological radar. The method includes at least the following steps: a first step of extracting gray level skeletons from images representing the data of the radar; a second step of associating characteristic data indicative of the state of the meteorological system with the gray level local extrema points; a third step of pairing each gray level skeleton of the two successive images; a fourth step of predicting future positions of the forms of the images; a fifth step of predicting trend data of the meteorological system; and a sixth step of representing the information originating from the sixth tracking step. The invention can notably be applied to the establishment of a prediction of trend of a cloud mass. The prediction of the trend of a meteorological situation may be presented to a pilot of an aircraft.

9 Claims, 7 Drawing Sheets

(56) References Cited

OTHER PUBLICATIONS

F. Dell'Acqua, et al., "A simple modal approach to the problem of meteorological object tracking," Geoscience and Remote Sensing Symposium, vol. 5, 2000 (IEEE 2002), pp. 2152-2154.

F. Barbaresco, et al., "Rain clouds tracking with radar image processing based on morphological skeleton matching," International Conference on Image Processing, vol. 1, 2001, pp. 830-833.

A. Nedzved, et al., "Gray-scale thinning by using a pseudo-distance map," The 18th International Conference on Pattern Recognition (ICPR'06), 2006.

C. Arcelli, et al., "Skeletal Lines in Gray-Tone Digital Pictures,", Digital Signal Processing Proceedings, 1997, pp. 879-882.

S. Langlois, et al., Cortical Sulci Model and Matching From 3D Brain Magnetic Resonance Images, Image Processing and its Applications, 1995.

Clementine Costes, et al., "Convective Clouds Modelling and Tracking by an Airborne Radar", Oceans 2008, Sep. 15, 2008, pp. 1-5, IEEE, Piscataway, NJ, USA, XP031482878.

Frederic Barbaresco, et al., "Rain Clouds Tracking with Radar Imaging Processing Based on Morphological Skeleton Matching", Proc. 2001 International Conference on Image Processing, Oct. 7, 2001, pp. 830-833, vol. 1, Thessaloniki, Greece, XP010564988.

Neill E. H. Bowler, et al, "Development of a Precipitation Nowcasting Algorithm Based Upon Optical Flow Techniques", Journal of Hydrology, Mar. 20, 2004, pp. 74-91, vol. 288, Nos. 1-2, XP002568451.

* cited by examiner

METHOD FOR PREDICTING A TREND OF A METEOROLOGICAL PHENOMENON ON THE BASIS OF DATA ORIGINATING FROM A METEOROLOGICAL RADAR

CROSS-REFERENCE TO RELATED APPLICATION

This application claims priority to foreign French patent application No. FR 09 03426, filed on Jul. 10, 2009, the disclosure of which is incorporated by reference in its entirety.

FIELD OF THE INVENTION

The present invention relates to a method for predicting a trend of a meteorological phenomenon on the basis of data originating from a meteorological radar. The invention can notably be applied to the establishment of a prediction of trend of a cloud mass. The prediction of the trend of a meteorological situation may be presented to a pilot of an aircraft.

BACKGROUND OF THE INVENTION

In the field of aviation, notably civil aviation, most aircraft are provided with meteorological radars or receive meteorological information. Meteorological information can originate from radars on board other aircraft, from meteorological radars on the ground for example. The availability, to an aircraft crew, of real-time meteorological data is crucial in the course of a flight so as to be able to avoid meteorological situations that could endanger the aircraft as well as its passengers. For example, aircraft pilots avoid entering convective cells like cumulonimbus. To this end, a meteorological situation representing notably clouds in a horizontal or vertical plane can allow a crew to avoid such zones of disturbances. Moreover, the ability to view a prediction of a short-term trend of the disturbance zones, may allow a crew to find the best possible trajectory for passing through an unstable meteorological zone.

Numerous schemes for modeling a meteorological situation have been developed, so as notably to be able to perform predictions of the trend of the situation. Objects making up a meteorological situation may be multifold: wind field, temperature field, clouds, precipitations. Objects such as clouds and associated precipitations can for example be described by using geometric information, texture information. Clouds and precipitations can also be described by a temporal trend of certain characteristics such as their size, the temperature. Among the existing modelings, a first modeling of clouds is described by Arnaud Y., Desbois M., Maizi J., in the following publication: "Automatic tracking and characterization of African convective systems on Meteosat pictures, Journal of Applied Meteorology, vol. 31, No. 5, 1992". This first modeling uses notably measurements of areas, of center of gravity, of extension length along two axes of each cloud. The form of each cloud is extracted beforehand from an image provided by a satellite radar. The extraction is carried out by a thresholding scheme.

A second modeling is proposed by Yang Y., Lin H., Guo Z., Fang Z., Jiang J., in the following publication: "Automatic tracking and characterization of multiple moving clouds in satellite images, IEEE international conference on systems, man and cybernetics, vol. 4, 2004". The scheme proposed by the second modeling is based notably on a contour of each cloud so as to measure an area, a deformation, a stretching of the cloud. The second modeling also uses Fourier descriptors for the contour of the cloud and a texture measurement performed on an image arising from the meteorological radar.

A third modeling is described by Dell'Acqua F., Gamba P., in the following publication: "A simple modal approach to the problem of meteorological object tracking, Geoscience and Remote Sensing Symposium, vol. 5, 2000". The third modeling proposes a representation of the contours of the clouds by eigenvectors, together with detection of the centroids of each cloud.

A fourth modeling is cited by Papin C., in "Analyse spatia-temporelle d'images météorologiques satellitaires: détection et suivi de structures nuageuses critiques" [Spatio-temporal analysis of satellite meteorological images: detection and tracking of critical cloud structures], Thesis of the University of Rennes 1, heading Signal processing and telecommunication, 1999". The fourth modeling uses identification of convective clouds by their contours, said contours being detected by a so-called level lines or active contours scheme.

A fifth modeling is described by Barbaresco F., Monnier B. in the following publication: "Rain clouds tracking with radar image processing based on morphological skeleton matching, International conference on image processing, vol. 1, 2001". In the fifth modeling, clouds are represented by their morphological skeleton.

Certain modeling criteria allow correct interpretation by a human being, this being the case notably for modeling schemes using centroids, contours and geometric criteria like areas, extensions of the forms. However, when a scheme takes the contour of the objects into account, the resulting modeling lacks robustness if the initial image is noisy. Another reason for this lack of robustness is also the fact that clouds are fluid objects whose contours can fluctuate without this being pertinent for the trend of the meteorological phenomenon. Modelings using contours are therefore not optimal for use by a computer-based processing like tracking. The modeling schemes using contours are notably the first, second and fourth modelings, as well as the third modeling.

Other modeling criteria give a modeling that is unintelligible to a human being since they are aimed only at providing a description of each cloud, adapted for use by computer-based processing. Such is notably the case for the second modeling scheme using Fourier descriptors and textures as well as for the third modeling scheme using a representation of the contours by eigenvectors. Indeed, eigenvector representation does not allow direct interpretation of the situation by a human operator.

The fifth modeling scheme gives a robust representation of a set of convective cells. However, with the fifth modeling scheme, there are losses of the gray level information, and therefore of the exact location of the convective cells. It is therefore not possible to follow the life cycle, for example their expansion, the maturity, the decay of the convective cells.

Moreover, the schemes described above exhibit the defect of fixing a spatial scale for analyzing the meteorological data. For example certain schemes use a low thresholding of the gray level images, for example of the order of some twenty or so dBZ, dBZ being an abbreviation for decibel Z. A low thresholding only allows tracking of big convective systems, thus it is impossible with such schemes to perform a prediction of the development of convective systems. Other schemes use a thresholding for example of the order of forty dBZ. Such a thresholding makes it possible only to locate the most intense convection zones: the individual cells of the convective systems. The identification of a convective cell from one image to another is not very robust, notably in the case of convective systems with several close cells. These schemes are therefore not very robust for performing trackings of the convective cells and deducing therefrom a prediction of their trend.

SUMMARY OF THE INVENTION

An aim of the invention is notably to predict a trend of a short-term meteorological situation. For this purpose, the subject of the invention is a method for predicting a trend of a meteorological system on the basis of data originating notably from a meteorological radar. The data can take the form of at least two successive gray level images. A gray level scale corresponds to a scale of the values of the data. Said method can comprise at least the following steps:

- A first step of extracting gray level skeletons from the images. The skeletons model notably forms represented on the images. The step of extracting gray level skeletons can identify characteristic points indicative of the geometry of the forms as well as gray level local extrema of the images;
- A second step of associating characteristic data indicative of the state of the meteorological system with the gray level local extrema points;
- A third step of pairing each gray level skeleton of the two successive images;
- A step of predicting future positions of the forms of the last of the two successive images, providing a predicted image by using the pairing;
- A step of predicting a trend of convective cells of the meteorological system by using the pairing. The convective cells may be represented by gray level local extrema on an image;
- A step of representing the information originating from the step of predicting a trend of convective cells and from the step of predicting future positions of forms.

The prediction step can construct trend functions for the convective cells by estimating time derivatives of characteristic data indicative of the state of the meteorological system at the points representing gray level local extrema in the predicted image.

The trend functions may be represented in the course of the representation step.

The method can comprise a step of predicting a global trend of the meteorological system for example, by combining the trend functions for the convective cells included in the meteorological system.

A global trend of the meteorological system may be represented in the course of the representation step.

The third pairing step can comprise construction of a set of pairing vectors for matching between paired parts of the skeletons of the two images.

A field of displacement vectors may be extrapolated from the set of pairing vectors.

The future positions of the forms may be deduced on the basis of the field of displacement vectors, notably by a displacement of each pixel of the last of the two images.

The method can comprise a step of simplifying the gray level skeletons extracted from the images, said simplification preserving notably the characteristic points indicative of the geometry of the skeletons as well as the gray level local extrema.

Each skeleton being able to comprise a set of segments, the third pairing step can comprise a pairing of the segments and a pairing of the characteristic points of the skeleton.

The main advantages of the invention are notably that of being robust and of making it possible to obtain a synthetic and intelligible representation of a trend of a potentially dangerous meteorological phenomenon.

BRIEF DESCRIPTION OF THE DRAWINGS

Other characteristics and advantages of the invention will become apparent with the aid of the description which follows, given by way of nonlimiting illustration and with regard to the appended drawings which represent.

DETAILED DESCRIPTION

Figure 1:
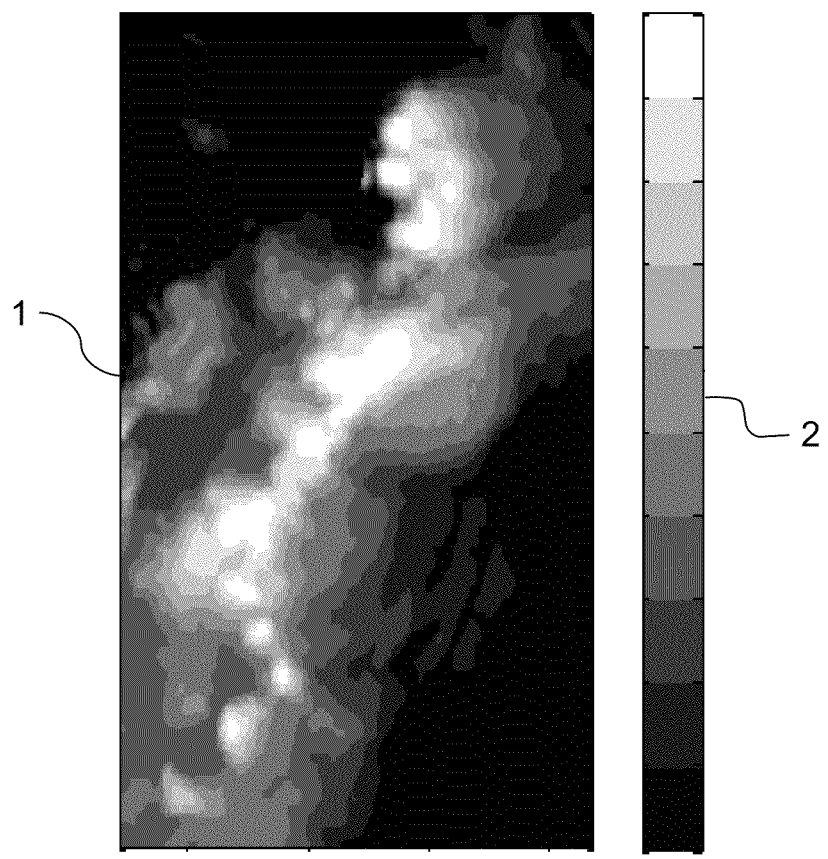
FIG. 1: an example of a first gray level image arising from data produced by a meteorological radar.

FIG. 1 represents an example of a first image 1 constructed on the basis of data provided by a meteorological radar. The meteorological radar may be on board an aircraft, a satellite. The radar can also be positioned in a meteorological ground station. A meteorological radar provides notably reflectivity data for the medium, expressed in dBZ, the abbreviation for decibel Z, $dBZ=mm6/m3$ on a logarithmic scale. The reflectivity data may be displayed as vertical or horizontal slices. Images representing the reflectivity data are generally defined with several gray levels: one then speaks of "gray level" images. To each gray level there corresponds a reflectivity value of the medium, the subject of the radar detection. On the images arising from a meteorological radar, a convective cell is characterized by a zone of strong reflectivity values. The reflectivity values generally decrease from the center of the cloud toward the periphery of the cloud. In a large-scale convective system, corresponding to a squall line for example, there may be several adjoining convective cells.

The first image 1 exhibits a portion of the atmosphere represented on a plane. The first image 1 presents for each position of the plane a reflectivity value Z expressed in decibels Z, dBZ. Each position of the plane is expressed in terms of latitude and longitude, the latitude and the longitude being expressed in degrees and corresponds to a position in the atmosphere. The decibel Z is a unit making it possible to express a reflectivity value Z on a logarithmic scale. With each reflectivity value is associated a gray level presented on a first gray level scale 2 of FIG. 1. Each pixel of the first image 1 therefore has a gray level corresponding to a reflectivity level of the position that it represents on the first image 1. The first image 1 exhibits variations of gray level intensity. The gray level intensity variations of the first image 1 make it possible to represent forms on the first image 1. On a radar image like the first image 1, a convective cell corresponding to a zone of strong reflectivity may be represented by the lightest gray levels.

Figure 2:
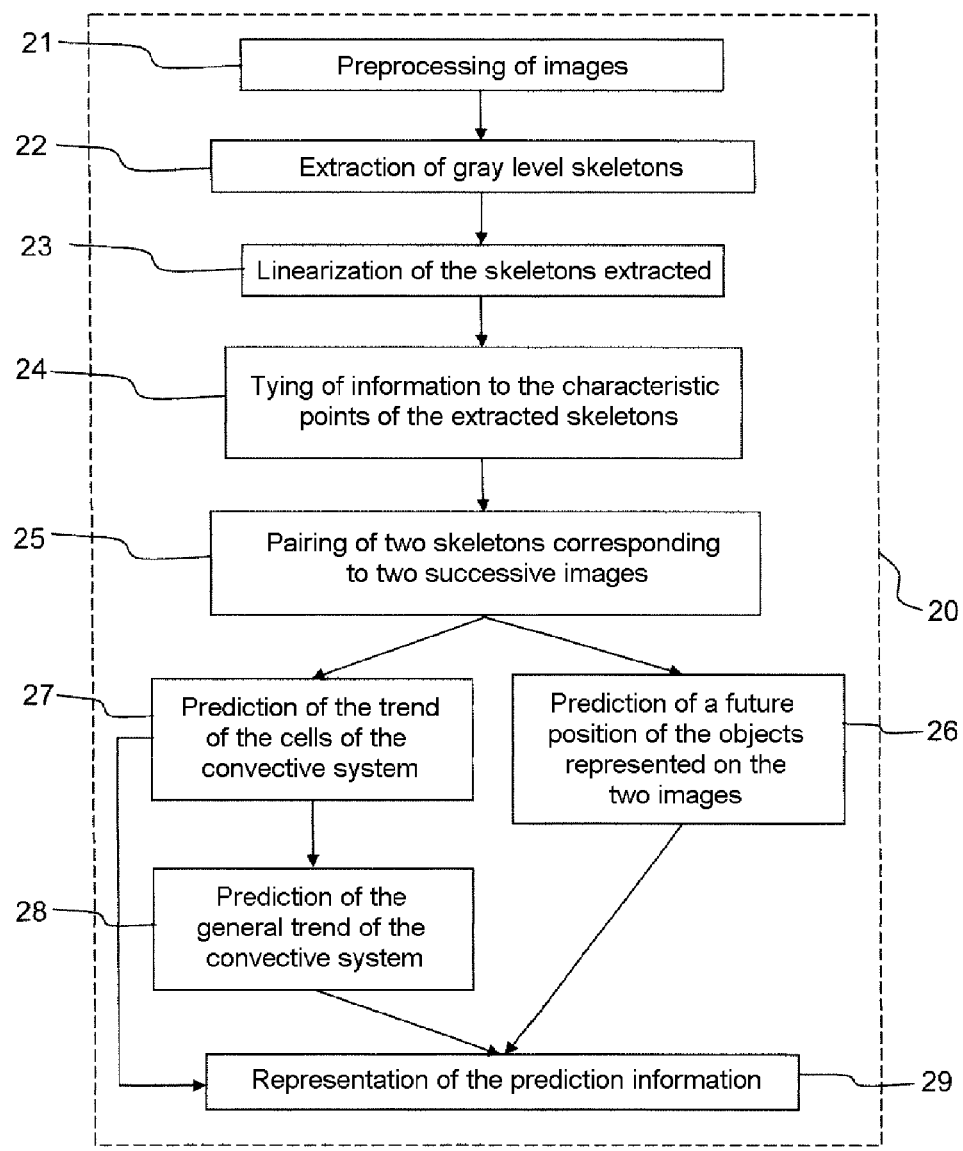
FIG. 2: several possible steps of a method of predicting the trend of forms according to the invention.

FIG. 2 represents several possible steps of a method of predicting the trend of forms 20 according to the invention. Forms may be clouds such as represented in FIG. 1. Forms are represented on an image comprising gray level intensity variations 2, like the first image 1 represented in FIG. 1. information provided by meteorological radars is generally represented on images exhibiting gray levels, dependent on the values of the physical quantities represented on the image. An algorithm for predicting the trend of forms according to the invention can, for example, be applied to a prediction of trend of forms such as the forms represented by gray level on the first image 1.

The modeling method 20 according to the invention uses a principle of modeling by morphological skeletons, while adapting a constraint taken into account to generate the skeletons. Generally, a skeleton of an object results from a thinning of the object until an extremely fine object is obtained. Applied to a gray level image, a skeleton represents a form by one or more curves, measuring for example one pixel in width. The constraint used in the principle of modeling by morphological skeletons is a constraint relating to the centering of the skeleton with respect to the contours of the form represented by the skeleton. This constraint relating to the centering of the skeleton is relaxed, in the case of the method according to the invention, in favor of a constraint of passage of the skeleton through gray level local extrema. A gray level local extremum corresponding notably to an extreme value of reflectivity level. An extreme value may be a local minimum or maximum value, according to a parametrization of the skeletonization method. For example a dark gray level can correspond to a minimum reflectivity. In the case of images originating from meteorological radars, such as the first image 1 represented in FIG. 1, the pixels having a light gray level can represent, for example, maxima of reflexivity values. The local maxima are particular skeletal points with which various data may be tied. The data tied to a particular point can, for example, present some interest in respect of a modeling of the meteorological system. Thus, data for example of the type:

reflectivity level;
altitude of a highest point of a cloud;
temperature;
nature and amount of precipitations, may be tied to each characteristic point making up the skeleton generated by the method 20 according to the invention.

A first step 21 of the method 20 according to the invention may be a step 21 of preprocessing the image 1 provided by the meteorological radar. The image preprocessing step 21 makes it possible to eliminate spurious elements present in the image 1. Spurious elements may give rise for example to a false detection of a form in an image. The preprocessing step makes it possible advantageously to improve the robustness of the method according to the invention as well as the robustness of the processings performed in the course of the following steps. The preprocessing step 31 can comprise a spatial filtering phase performing a smoothing of the image. Generally, a spatial filtering is a scheme for enhancing an image modifying the value of the pixels of the image as a function of the value of the nearby pixels. A smoothing spatial filtering can use for example a Gaussian filter, a median filter. The preprocessing step 21 can also comprise a phase of enhancing zones of low intensity, for example zones with low gray levels, included inside a form of the image.

A second step 22 of the method 20 according to the invention is a step of extracting skeletons of forms present for example in the first image 1. The step of extracting skeletons uses a criterion relating to the gray levels, that is to say relating to the reflectivity values represented by the gray levels, of the pixels of the image provided by the radar after the preprocessing step 21. The step of extracting skeletons 22 can use various algorithms for extracting skeletons as a function of gray level. For example, it is possible to use algorithms such as described by:

Nedzved A., Uchida S., Ablameyko S. in "Gray-scale thinning by using a pseudo-distance map, ICPR06 Proceedings, 2006", an algorithm based on a pseudo-distance map;

Arcelli C., Ramella G. in "Skeletal lines in gray-tone digital pictures, Digital Signal Processing Proceedings, 1997", an iterative thinning algorithm.

Figure 3:
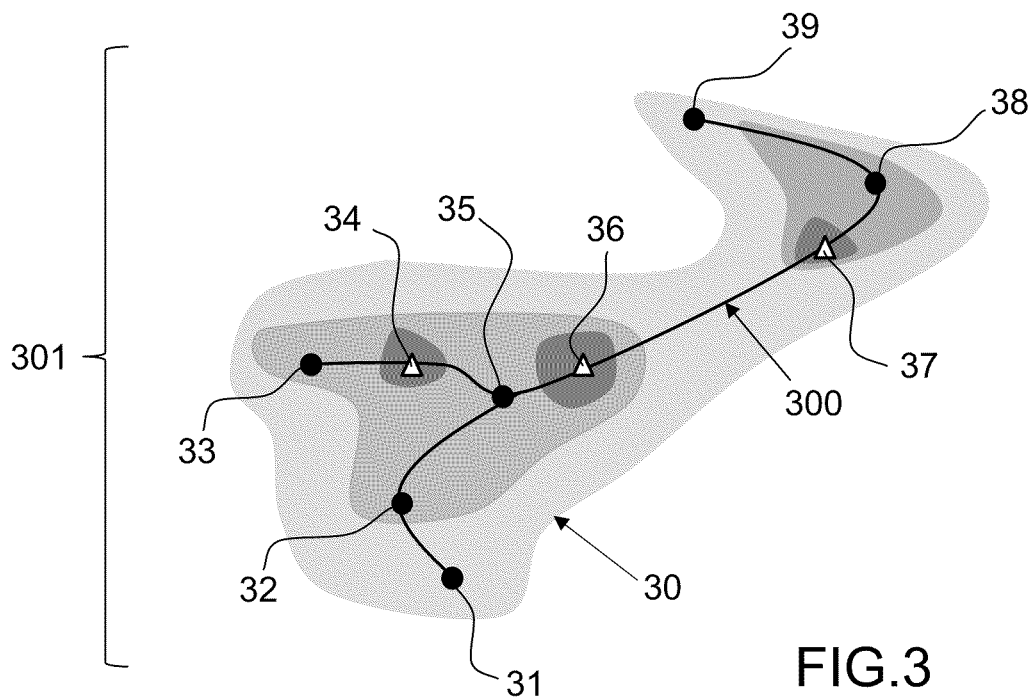
FIG. 3: an example of a first skeleton arising from the second step of skeleton extraction, represented on a second image.

Advantageously, the algorithm for extracting skeletons as a function of gray level is such that a small modification of gray level in the image brings about a small modification of the skeleton obtained. The result is a set of connected curves for each object of the processed radar image, as represented in FIG. 3. Each connected curve is a gray level skeleton. With each gray level skeleton may be associated an identifier used subsequently.

FIG. 3 represents an example of a first skeleton 300 arising from the second step of gray level skeleton extraction 22 according to the invention, represented in FIG. 2. The first skeleton 300 models a first form 30, for example a cloud form, said cloud form originating from a first image 301. The first form 30 is represented for the example in a simplified way with three gray levels. The first skeleton 300 is shaped in the form of curves passing through defined points 31, 32, 33, 34, 35, 36, 37, 38, 39. Among the defined points, first points 31, 32, 33, 35, 38, 39 are geometric characteristic points making it possible to describe the form modeled by the first skeleton 300. Second points 34, 36, 37 are points each representing a local maximum reflectivity. The second points 34, 36, 37 are points of interest of the first skeleton 300 making it possible to model a physical system as a meteorological phenomenon. Characteristic points indicative of the geometry of the form may coincide with points of interest for the physical description of the model.

The method 20 according to the invention can comprise a third step 23 of linearizing the skeletons, extracted in the course of the second step 22. The third linearization step is represented in FIG. 2. The linearization of the skeletons 23 is a simplification of the skeletons making it possible to obtain a skeleton structure that is simple to manipulate with processing algorithms. The step of simplifying the skeletons 33 makes it possible to pass from a list of points, to a graph of straight segments, or lines, forming the skeleton. Each point is associated with a pixel of the image. The principle of simplifying the skeletons is to select and to preserve only characteristic points indicative of the geometry of a skeleton or of the physical system that it models. A characteristic point of a skeleton may be a start or end point of a skeleton, a junction point between two or more lines, a point of strong incurvation of the skeleton, a point with a maximum or minimum gray level, for example. Thereafter the skeleton portion between two characteristic points is approximated by a straight segment. The extracted skeletons therefore form the subject of a linear transformation allowing a simplification of the representation of the skeletons. The gray level skeletons therefore pass, for example, through local maxima of the image. On a meteorological image, the points of local maxima correspond to centers of convective cells. An exemplary skeleton arising from a linear transformation is represented in FIG. 4.

Figure 4:
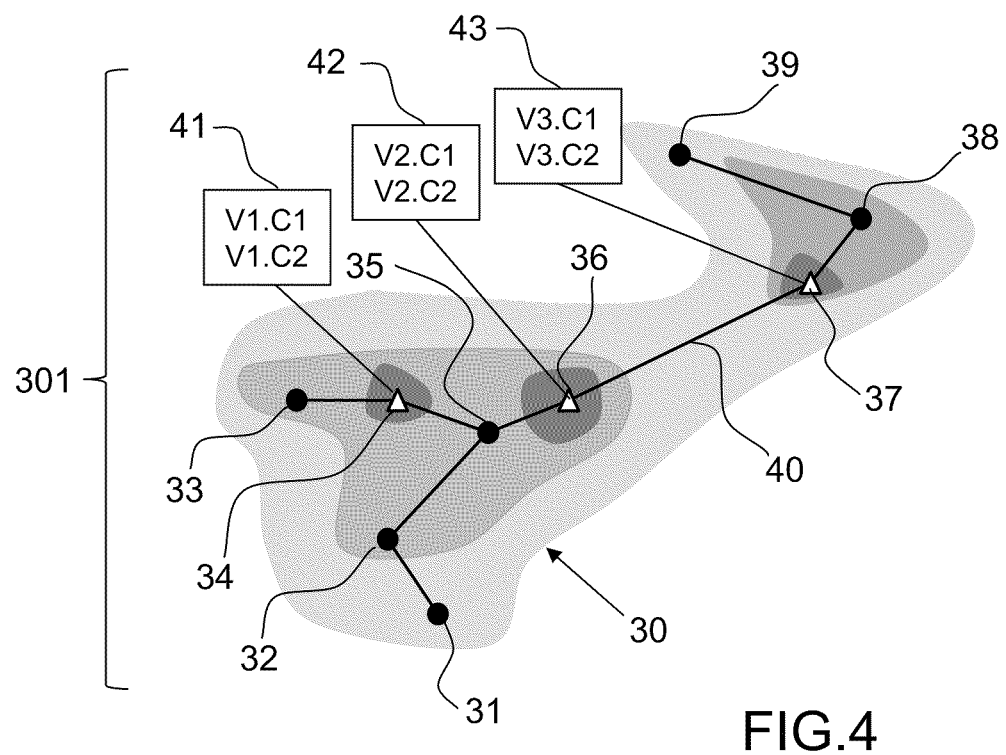
FIG. 4: an example of a second skeleton in linear gray level, represented on the second image.

FIG. 4 represents an example of a second linear skeleton 40. The second skeleton 40 is the result of the step 23 of linearizing the first skeleton 300 modeling the first form 30 of the first image 301, represented in FIG. 3. The set of points 31, 32, 33, 34, 35, 36, 37, 38, 39, are linked by straight segments on completion of the linearization step 23.

A fourth step 24 of the method according to the invention may be a step of tying information 24 to points of the skeletons exhibiting gray level local extrema. This step therefore makes it possible to enrich characteristic points with meteorological data, for example. When modeling a meteorological situation, relevant information tied to a point of physical interest may be the following:
- value of the reflexivity at a given altitude vertically in line with the point of interest;
- maximum value of reflectivity vertically in line with the point of interest;
- altitude at which a maximum reflectivity is observed;
- altitude of the highest point exceeding a certain reflectivity threshold vertically in line with the point of interest, the highest point being a summit of the cloud;
- vertical gradient of reflectivity;
- horizontal gradient of reflectivity;
- temperature value at a given altitude;
- altitude of the point with temperature equal to zero degrees vertically in line with the point of interest;
- nature of precipitations at a given altitude;
- precipitation rate at a given altitude;
- wind speed vector.

Other information, of such a nature as to characterize the internal activity of the cloud, for example, may be tied to a point of interest. It is also possible to supplement this information with a data item specifying the relative position of the point of interest in the cloud: for example an indication of a central point, of an end point.

The association of meteorological information suitable for describing a cell's convection intensity makes it possible subsequently to perform a prediction of the internal trend of the convective cell and therefore an internal trend of the cloud. The meteorological information or data may originate:
- from the first radar image;
- from a set of radar data, notably obtained through an analysis of the reflectivity field in three dimensions;
- from another sensor.

FIG. 4 represents an exemplary tying of information to characteristic points of skeletons, For example, the second points of interest 34, 36, 37, can respectively be associated with a list 41, 42, 43 of values of meteorological data V1.C1, V1.C2, V2.C1, V2.C2, V3.C1, V3.C2 for example. Each item of meteorological data V1.C1, V1.C2, V2.C1, V2.C2, V3.C1, V3.C2 has a value specific to each second point of interest 34, 36, 37.

The prediction method 20 according to the invention can comprise a fifth step 25 of pairing skeletons corresponding to two successive images. The skeletons are skeletons arising from the third step 23 of linearizing the skeletons, said skeletons modeling two successive radar images. A skeleton of a first image may be paired with several skeletons of a second image or not be paired with any skeleton of the second image, and vice versa for a skeleton of the second image. The skeleton of an object may consist of a single point. Various pairing methods may be implemented in the course of this step. A first pairing method is notably described by:
- Barbaresco F., Legoupil S., Monnier B., in the patent application FR2779548: "Procédé de SUM dynamique de l'évolution de milieux déformables et de prédiction de leer évolution" [Method of dynamically tracking the trend of deformable media and predicting their trend];
- Langlois S., Royackkers N., Fawal H., Desvignes M., Revenu M., Travere J. M Cortical Sulci in: "Model and matching from 3D brain magnetic resonance images, Image Processing and its Applications", in 1995.

Straight segments of the skeletons may be paired by examining pairwise the segments of the skeletons of each image and by measuring their resemblance according to geometric parameters. An example of a result of step 25 of pairing segments of two successive images is represented in FIG. 5.

Figure 5:
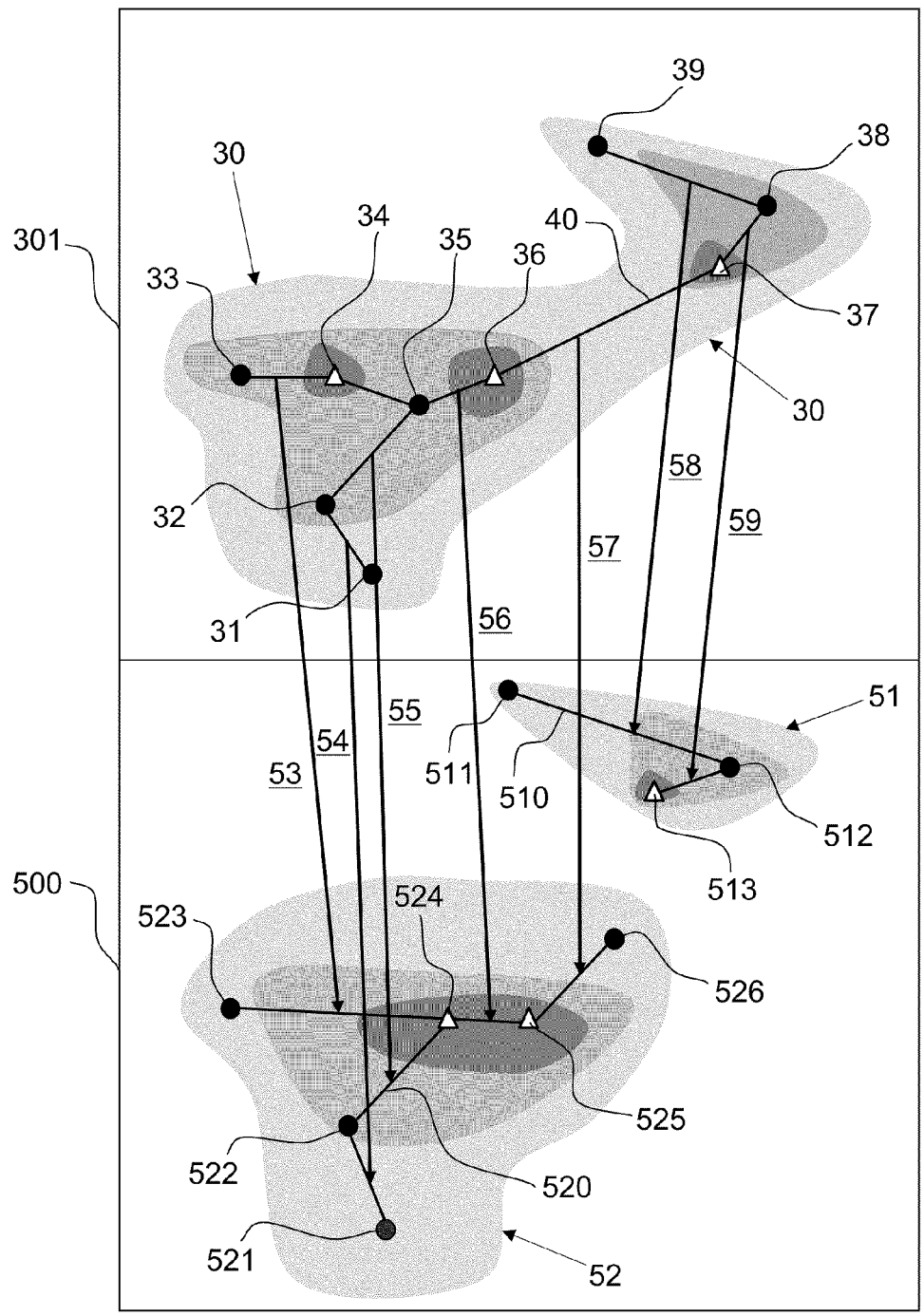
FIG. 5: an exemplary segment pairing of two successive images.
Figure 6:
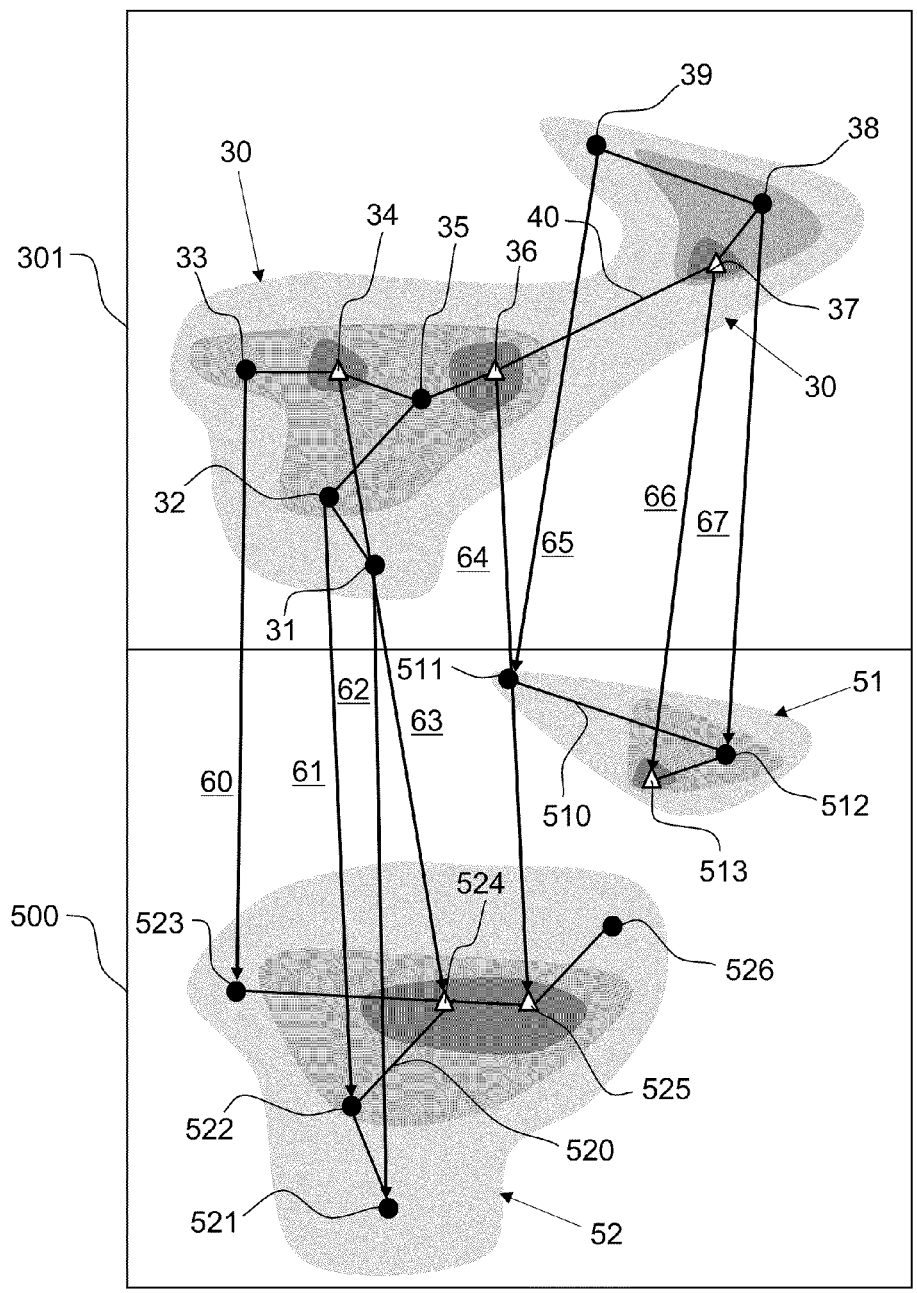
FIG. 6: an exemplary pairing of characteristic points of two successive radar images.

FIG. 5 represents an exemplary matching of segments of the second skeleton 40 originating from the first image 301 with segments of the skeletons 510, 520 originating from a second image 500. The third image 301 comprises a second form 51 modeled by a third skeleton 510. The third skeleton 510 is a linear skeleton obtained by processing the third image 301 through the steps: of preprocessing images 21, of extracting gray level skeleton 22, of linearizing gray level skeletons 23 and then of tying information 24 to the characteristic points 511, 512, 513 of the third skeleton 510. The third skeleton 510 comprises three characteristic points 511, 512, 513, one point 513 of which is at one and the same time an end of the third skeleton 510 and a point of physical interest for the description of the model. The third image 301 also comprises a third form 52 modeled by a fourth skeleton 520. The fourth skeleton 520 comprises six characteristic points 521, 522, 523, 524, 525, 526, two of which are particular points 524, 525 exhibiting interest for the modeling of the physical system. The pairing between the second skeleton 40 and the third and fourth skeletons 510, 520 can be performed segment by segment. Each segment of the second skeleton 40 is therefore paired with a segment of the third or of the fourth skeleton 510, 520. Thus the pairing step allows the definition of a first set of pairing vectors of segments 53, 54, 55, 56, 57, 58, 59.

it is also possible to match the various characteristic points of each skeleton of the two successive images. An exemplary pairing of the characteristic points is represented in FIG. 6. A pairing of characteristic points is either calculated directly, or deduced from the pairing of the segments of the skeletons.

FIG. 6 represents the same images 301, 500, forms 30, 51, 52, skeletons 40, 510, 520, characteristic points as FIG. 5. FIG. 6 represents a pairing between the characteristic points of the second skeleton 40 and the characteristic points of the third and fourth skeletons 510, 520. The pairing of the characteristic points makes it possible to create a second set of vectors 60, 61, 62, 62, 64, 65, 66, 67 each linking a characteristic point of the second skeleton 40 with a characteristic point of the third skeleton 510 or a characteristic point of the fourth skeleton 520. A characteristic point may be paired with two characteristic points of another skeleton: such is for example the case when a convective cell divides into two convective cells.

The pairing 25 thus makes it possible to perform a tracking of the forms of the clouds as well as of the characteristic points of the convective systems, namely the clouds.

The pairing step 25 also makes it possible to construct a field of displacement vectors by extrapolating the pairing vectors of segments of two successive images and the pairing vectors of characteristic points of the two successive images. Such a field of vectors is represented by way of example in FIG. 7.

Figure 7:
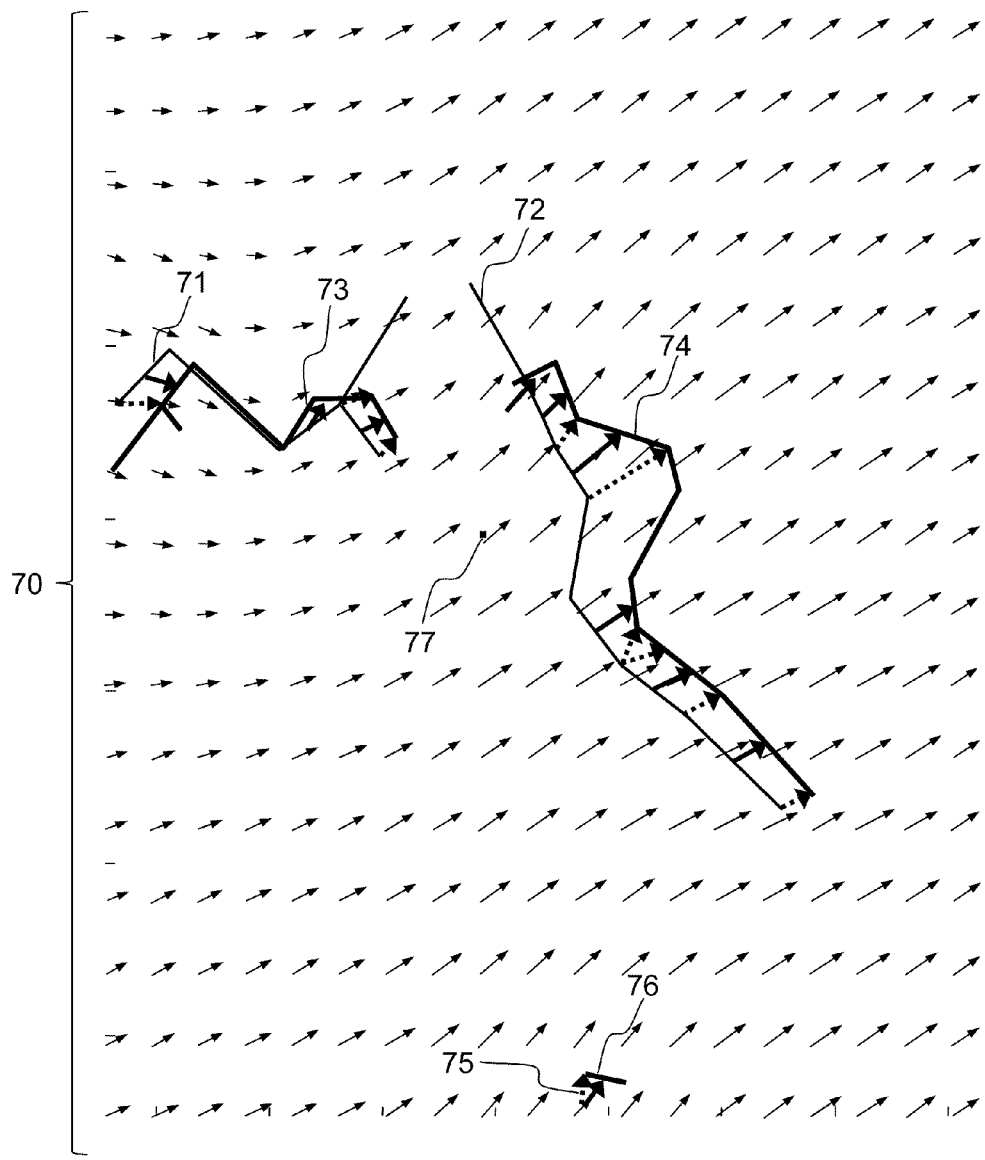
FIG. 7: an example of a field of vectors which is deduced therefrom of the pairing of skeletons of two successive radar images.

FIG. 7 therefore represents a field of displacement vectors 70 such as may be given by the pairing step 25 according to the invention. The displacement vector field 70 is notably calculated on the basis of vectors for pairing a fifth skeleton 71 with a sixth skeleton 73, a seventh skeleton 72 with an eighth skeleton 74, an n-th skeleton consisting of a single characteristic point 75 with a ninth skeleton 76. FIG. 7 also comprises a second characteristic point 77 appearing between the two paired images. The second isolated point 77 is not paired with any other characteristic point.

A sixth step of the prediction algorithm 20 according to the invention may be a step 26 of predicting the future positions of objects contained in the radar images. The sixth step 26 can also be defined as a step of advecting the convective system, that is to say the displacement in a horizontal plane of the convective system. A future position of the objects may be obtained by displacing them in accordance with the pairing vector field calculated in the course of the pairing step 25. Among the schemes that may be used to predict the future position of objects, two are notably described by Barbaresco F., Legoupil S., Monnier B., in the patent application FR2779548: "Procédé de suivi dynamique de revolution de milieux déformables et de prediction de leur évolution" [Method of dynamically tracking the trend of deformable media and predicting their trend].

A first scheme makes it possible to displace each skeleton in compliance with the pairing vectors established during the matching of the two successive images. The first scheme exhibits the advantage of making it possible to transmit a compressed item of information on low-speed communication channels. For example, when two airplanes are following one another on one and the same course, a system using the prediction algorithm according to the invention 20 on board the first airplane makes it possible to calculate on the basis of two images obtained at a first time t−dt and at a second time t, a predicted position of clouds at a third time t+dt, in skeleton form. dt represents a small time gap. The skeleton can then be transmitted to the second aircraft through a low-speed link. Thus it is possible to obtain for the second aircraft a prediction at a fifth time t+3×dt on the basis of the skeleton received by a system implementing the method according to the invention on board the second aircraft, and of a single image at the fourth time t+2×dt.

Figure 8:
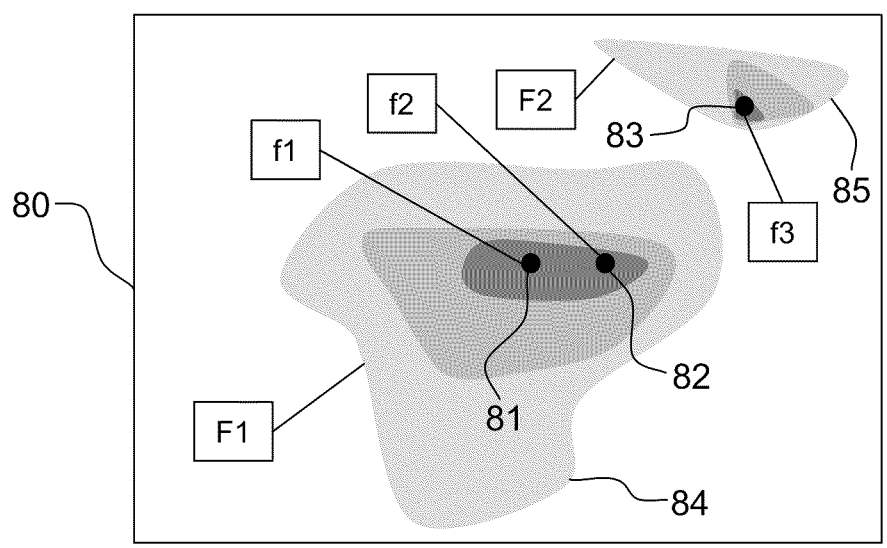
FIG. 8: an example of an image arising from a prediction step of the method according to the invention.

A second scheme extrapolates the pairing vectors as a vector field 70 such as represented in FIG. 7. The vector field 70 makes it possible to displace the forms of the last image pixel by pixel. The second scheme makes it possible advantageously to produce a complete image of the predicted forms. The predicted image can then be presented for example to a crew of an aircraft. Such a predicted image 80 is represented in FIG. 8.

Advantageously, whatever scheme is employed to perform the prediction step 26, it is possible to predict cloud positions at a time t+n×dt, n being a positive real number, given an image at a first time t−dt and an image at a second time t. It suffices to extend the pairing vectors as a function of n×dt or to displace the pixels n times in accordance with the field of displacement vectors 70.

A seventh step 27 of the method according to the invention 20 may be a step of predicting a trend of the cells of the convective system 27. Prediction of the trend of the cells of the convective system makes it possible to follow the internal trend of the system.

The characteristic points of the cloud or clouds are characterized by a list of meteorological data, such as represented in FIG. 4. The pairing of the points of the skeleton makes it possible to identify each convective cell from one image to another. This knowledge makes it possible to estimate time derivatives of each item of meteorological data $C_i$, i being an index corresponding to a type of data:

$$\frac{\partial C_i}{\partial t} \approx \frac{C_i(t) - C_i(t - \Delta T)}{\Delta T}.$$

The derivatives of each item of meteorological data make it possible to characterize the life cycle of the cloud. For example, it is possible to identify whether the cell is in a phase of growth, maturity or decay by examining the sign of the derivative of the meteorological data "reflectivity at a given altitude" and "altitude of the summit of the cloud".

In order to take advantage of the various given data, it is possible to define a trend function $$f_{\Delta t}\left(C_i(t), \frac{\partial C_i}{\partial t}(t)\right)$$

by combining various data, via a weighted sum, or via a decision tree, for example.

The trend function $f_{\Delta t}$ makes it possible to combine the values of the meteorological data at an instant t and their time derivatives, so as to more precisely define the life cycle of the clouds, and to specify a danger level of the convective system, for example for an airplane having to pass through a cloudy region. The trend function $f_{\Delta t}$ is parametrized by the duration Δt between the last known instant and the predicted instant:

$$\Delta t = n \times dt, \Delta t$$

can thus be a prediction time interval.

Non-numerical data, for example a type of precipitation, can also be integrated into the trend function $f_{\Delta t}$, notably if the trend function takes the form of a decision tree.

An eighth step 28 may be a step of predicting the general trend of the convective system 28. The general trend of the convective system is its general tendency to grow, that is to say to increase in intensity, to be stable, or to decay, that is to say diminish in intensity. The general trend of the system combined with an item of information regarding advection, that is to say horizontal displacement of the system, provides as complete as possible an item of information regarding the danger represented by a complete convective system for an aircraft for example.

Moreover, it is interesting to detect phenomena of merging and splitting affecting the topology of the clouds such as when a cloud splits into two parts. During a split, if one of the resulting clouds is small, it is liable to decay rapidly. Conversely, during a merge, the resulting convective system increases in intensity.

A comparison of the identifiers of the skeletons of the starting image and of the finishing image makes it possible to detect the merging and splitting phenomena.

The general tendency of the convective system may be estimated by combining the trend functions $f_{\Delta t}$ calculated for each convective cell included in the system, and the occurrence of the phenomena of change of topology.

For very big convective systems, it is also possible to segment the system into regions in which regional tendencies may be calculated. For example, on a squall line, it is possible to observe mean trends on various portions of the line.

The data tracked may be followed over several images. In this case, known schemes such as Kalman filtering may make it possible to improve the quality of the prediction.

FIG. 8 represents a predicted image 80. The predicted image comprises several characteristic points 81, 82, 83 of the convective system. To each characteristic point 81, 82, 83 can correspond a trend function $f\Delta t$ respectively f1, f2, f3. The two forms 84, 85 of FIG. 8 correspond to two distinct convective systems. Each convective system 84, 85 may be characterized by a global trend function F1, F2 making it possible to ascertain notably its trend state.

Advantageously, the method according to the invention can allow a predicted position of the clouds to be displayed to an aircraft pilot, accompanied by a marking indicating a probable state of the convective systems at the moment of the prediction. The probable state of the convective systems depends notably on the prediction lag. The probable state of the convective systems may be given by a danger level on a graduated scale, or by a predicted value for certain pertinent parameters such as a mean altitude of the summit of the convective cells.

Advantageously, the method according to the invention comprises a step of modeling forms by gray level skeletons making it possible at one and the same time:
  to locate relevant individual cells in regard to the forms contained in an image arising from a meteorological radar;
  to represent the physical system as a synthetic overview.

Notably, within the framework of a radar tracking processing of meteorological phenomena, a representation by gray level skeleton obtained by the method according to the invention advantageously allows robust pairing of objects of two successive images. Moreover, the fact that the gray level skeleton is conditioned by the existence of local maxima of gray levels advantageously ensures that displacements detected by the radar tracking processing are indeed those of convective cells, such as eyes of storms, and not fluctuations of intensity at the periphery of clouds.

Advantageously, the method according to the invention makes it possible to analyze the trend of a convective system so as to better understand the physical phenomena involved. Indeed, by modeling the displacements of the convective cells and tracking their trend it is possible to achieve fine modeling of convective systems so as to better understand the physics of their trend.

Advantageously, skeleton-based modeling makes it possible to properly follow a trend of the convective system modeled. Indeed, the skeletons are deformable as a function of the trend of the convective system.

The advection of the convective systems may be tracked in a robust manner by the method according to the invention, based on tracking complete systems. It is also possible to follow an internal trend of a convective system by virtue of the method according to the invention by following the trend of each convective cell.

Advantageously, the method according to the invention allows real-time display of the predicted state of the meteorological system to the pilot of the aircraft.

The invention claimed is:

1. A method of predicting a trend of a meteorological system on the basis of data originating from a meteorological radar, said data taking the form of at least two successive gray level images, a gray level scale corresponding to a scale of the values of the data, said method comprising at least the following steps:
  a first step of extracting gray level skeletons from the images, said skeletons modeling forms represented on the images, the step of extracting gray level skeletons identifying characteristic points indicative of the geometry of the forms as well as gray level local extrema of the images;
  a second step of associating characteristic data indicative of the state of the meteorological system with the gray level local extrema points;
  a third step of pairing each gray level skeleton of the two successive images;
  a step of predicting future positions of the forms of the last of the two successive images, providing a predicted image by using the pairing;
  a step of predicting a trend of convective cells of the meteorological system, said convective cells being represented by gray level local extrema on an image, said step of predicting the trend of convective cells using the pairing to construct trend functions for the convective cells by estimating time derivatives of characteristic data indicative of the state of the meteorological system at the points representing gray level local extrema in the predicted image; and
  a step of representing the information originating from the step of predicting a trend of convective cells and from the step of predicting future positions of forms.

2. The prediction method as claimed in claim 1, wherein the trend functions are represented in the course of the representation step.

3. The prediction method as claimed in claim 1, further comprising a step of predicting a global trend of the meteorological system by combining the trend functions for the convective cells included in the meteorological system.

4. The prediction method as claimed in claim 3, wherein a global trend of the meteorological system is represented in the course of the representation step.

5. The prediction method as claimed in claim 1, wherein the third pairing step comprises construction of a set of pairing vectors for matching between paired parts of the skeletons of the at least two images.

6. The prediction method as claimed in claim 5, wherein a field of displacement vectors is extrapolated from the set of pairing vectors.

7. The prediction method as claimed in claim 6, wherein the future positions of the forms are deduced on the basis of the field of displacement vectors by a displacement of each pixel of the last of the at least two images.

8. The prediction method as claimed in claim 1, further comprising a step of simplifying the gray level skeletons extracted from the images, said simplification preserving the characteristic points indicative of the geometry of the skeletons as well as the gray level local extrema.

9. The prediction method as claimed in claim 1, wherein each skeleton comprises a set of segments, and the third pairing step comprises a pairing of the segments and a pairing of the characteristic points of the skeleton.

* * * * *